US012770198B2

(12) United States Patent
Coutinho et al.

(10) Patent No.: US 12,770,198 B2
(45) Date of Patent: Oct. 20, 2026

(54) SYSTEM AND METHOD FOR SERVERLESS MODIFICATION AND EXECUTION OF MACHINE LEARNING ALGORITHMS

(71) Applicant: ADP, Inc., Roseland, NJ (US)

(72) Inventors: Roberto Coutinho, Porto Alegre (BR); Roberto Silveira, Porto Alegre (BR); Guilherme Gomes, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 66 days.

(21) Appl. No.: 18/449,679

(22) Filed: Aug. 14, 2023

(65) Prior Publication Data

US 2023/0385952 A1 Nov. 30, 2023

Related U.S. Application Data

(63) Continuation of application No. 17/205,048, filed on Mar. 18, 2021, now Pat. No. 11,727,503.

(51) Int. Cl.

*G06Q 40/12* (2023.01)
*G06N 3/04* (2023.01)
*G06N 3/08* (2023.01)
*G06Q 10/067* (2023.01)

(52) U.S. Cl.

CPC ............. *G06Q 40/125* (2013.12); *G06N 3/04* (2013.01); *G06N 3/08* (2013.01); *G06Q 10/067* (2013.01)

(58) Field of Classification Search

None

See application file for complete search history.

(56) References Cited

U.S. PATENT DOCUMENTS

| | | | | |
|---|---|---|---|---|
| 2017/0236060 | A1 | 8/2017 | Ignatyev | |
| 2018/0096372 | A1* | 4/2018 | Rickard, Jr. | G06N 5/01 |
| 2018/0357564 | A1* | 12/2018 | Braghin | G06N 5/04 |
| 2019/0026150 | A1* | 1/2019 | Shimamura | G06F 9/4881 |
| 2019/0095499 | A1 | 3/2019 | Payne et al. | |
| 2019/0197433 | A1* | 6/2019 | Saha | G06N 5/022 |
| 2019/0347282 | A1* | 11/2019 | Cai | G06N 5/022 |
| 2019/0356736 | A1* | 11/2019 | Narayanaswamy | H04L 49/10 |
| 2020/0019893 | A1* | 1/2020 | Lu | G06N 5/025 |
| 2020/0184380 | A1* | 6/2020 | Thomas | G06N 3/09 |
| 2020/0233733 | A1* | 7/2020 | Faulhaber, Jr. | G06N 20/00 |
| 2021/0004915 | A1 | 1/2021 | Schrage | |
| 2021/0117857 | A1* | 4/2021 | Sriharsha | G06F 16/285 |

(Continued)

OTHER PUBLICATIONS

International Search Report issued in corresponding International Application No. PCT/US2022/020393, dated Jul. 13, 2022 (10 pages).

(Continued)

*Primary Examiner* — William J Jacob

(74) *Attorney, Agent, or Firm* — Foley & Lardner LLP

(57) ABSTRACT

Systems, methods, and computer-readable storage media for identifying and generating insights using machine learning and serverless computing systems. When events are detected, data from those events is collected and formatted into predefined formats. That formatted data is then used within an instance, where a machine learning algorithm is executed by a serverless computing system using the data within the instance as input. The result from the machine learning algorithm is an insight into the event and event data, which can be presented to users for interpretation.

20 Claims, 5 Drawing Sheets

(56) References Cited

U.S. PATENT DOCUMENTS

| | | | | |
|---|---|---|---|---|
| 2021/0124822 | A1* | 4/2021 | Tiwary | G06F 21/53 |
| 2021/0312317 | A1* | 10/2021 | Sarferaz | G06N 20/00 |

OTHER PUBLICATIONS

US Notice of Allowance on U.S. Appl. No. 17/205,048 dated Mar. 31, 2023 (10 pages).
US Office Action issued in corresponding U.S. Appl. No. 17/205,048, dated Oct. 3, 2022 (20 pages).
International Preliminary Report on Patentability issued in corresponding International Application No. PCT/US2022/0203933, dated Sep. 12, 2023 (7 pages).
Christidis Angelos et al: "Enabling Serverless Deployment of Large-Scale AI Workloads", IEEE Access, IEEE, USA, vol. 8, Apr. 2, 2020 (Apr. 2, 2020), pp. 70150-70161, XP011785055, DOI: 10.1109/ACCESS.2020.2985282 [retrieved on Apr. 21, 2020]. 12 pgs.
Extended European Search Report issued in corresponding EP Patent Application No. 22772063.8, dated Jan. 9, 2025 (10 pages).
Communication pursuant to Article 94(3) EPC issued in corresponding EP Patent Application No. 22772063.8 dated Jan. 7, 2026 (8 pages).

* cited by examiner

SYSTEM AND METHOD FOR SERVERLESS MODIFICATION AND EXECUTION OF MACHINE LEARNING ALGORITHMS

BACKGROUND

1. Cross-Reference to Related Applications

This application is a continuation of U.S. Pat. No. 11,727,503 filed Mar. 18, 2021, which is incorporated herein by reference in its entirety.

2. Technical Field

The present disclosure relates to using machine learning, and more specifically to modifying and executing machine learning algorithms within a serverless computing environment.

3. Introduction

Serverless computing allows a cloud computing provider to provide services which allocate machine resources on demand, allowing users of the services to perform computations as needed. Serverless computing systems operate as a "Function as a Service" (FaaS) platform, where the user requests the service to execute one or more functions, where execution of that function is referred to as an "Instance" and where the user may provide inputs to each respective instance. Examples of current serverless computing systems includes Amazon Web Services (AWS) Lambda™, Google Cloud Functions™, and Microsoft Azure™.

Using machine learning algorithms within a serverless computing environment can be restricted due to memory requirements of the instances within the serverless system, and more so when the machine learning algorithms are processing human capital data where the data may be less quantitative in nature and represents specific domain subject matter. In addition, where multiple machine learning algorithms are available, there is a need for a mechanism to select a particular machine learning algorithm for execution of the instance based on the inputs received from the user.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a computer system, a notification regarding an occurrence of an event; formatting, via a processor within the computer system, the event into a predefined format, resulting in a formatted event item; inserting, via the processor, the formatted event item into a serverless computing instance, resulting in a serverless instance for the event; inserting, via the processor, additional details associated with the event into the serverless instance for the event, resulting in a modified serverless instance for the event; transmitting, from the computer system to a serverless computing system, a request to execute the modified serverless instance for the event, wherein execution by the serverless computing system of the modified serverless instance comprises: selecting a machine learning algorithm from a plurality of machine learning algorithms within the serverless computing system based on a type of the event; selecting a set of business rules from a plurality of business rules; modifying execution of the machine learning algorithm based on a comparison of the set of business rules and the additional details, resulting in a modified machine learning algorithm; and executing the modified machine learning algorithm using the additional details, resulting in the insight; receiving, at the computer system from the serverless computing system, an insight regarding the event; and displaying, via a display of the computer system, the insight.

A system configured to perform the concepts disclosed herein can include: a processor; and a computer-readable storage medium having instructions stored which, when executed by the processor, cause the processor to perform operations comprising: receiving, at a computer system, a notification regarding an occurrence of an event; formatting, via a processor within the computer system, the event into a predefined format, resulting in a formatted event item; inserting, via the processor, the formatted event item into a serverless computing instance, resulting in a serverless instance for the event; inserting, via the processor, additional details associated with the event into the serverless instance for the event, resulting in a modified serverless instance for the event; transmitting, from the computer system to a serverless computing system, a request to execute the modified serverless instance for the event, wherein execution by the serverless computing system of the modified serverless instance comprises: selecting a machine learning algorithm from a plurality of machine learning algorithms within the serverless computing system based on a type of the event; selecting a set of business rules from a plurality of business rules; modifying execution of the machine learning algorithm based on a comparison of the set of business rules and the additional details, resulting in a modified machine learning algorithm; and executing the modified machine learning algorithm using the additional details, resulting in the insight; receiving, at the computer system from the serverless computing system, an insight regarding the event; and displaying, via a display of the computer system, the insight.

A non-transitory computer-readable storage medium configured as disclosed herein can have instructions stored which, when executed by a computing device (such as a processor), cause the computing device to perform operations which include: receiving, at a computer system, a notification regarding an occurrence of an event; formatting, via a processor within the computer system, the event into a predefined format, resulting in a formatted event item; inserting, via the processor, the formatted event item into a serverless computing instance, resulting in a serverless instance for the event; inserting, via the processor, additional details associated with the event into the serverless instance for the event, resulting in a modified serverless instance for the event; transmitting, from the computer system to a serverless computing system, a request to execute the modified serverless instance for the event, wherein execution by the serverless computing system of the modified serverless instance comprises: selecting a machine learning algorithm from a plurality of machine learning algorithms within the serverless computing system based on a type of the event; selecting a set of business rules from a plurality of business rules; modifying execution of the machine learning algorithm based on a comparison of the set of business rules and the additional details, resulting in a modified machine learning algorithm; and executing the modified machine learning algorithm using the additional details, resulting in the insight; receiving, at the computer system from the serverless computing system, an insight regarding the event; and displaying, via a display of the computer system, the insight.

DETAILED DESCRIPTION

Figure 1:
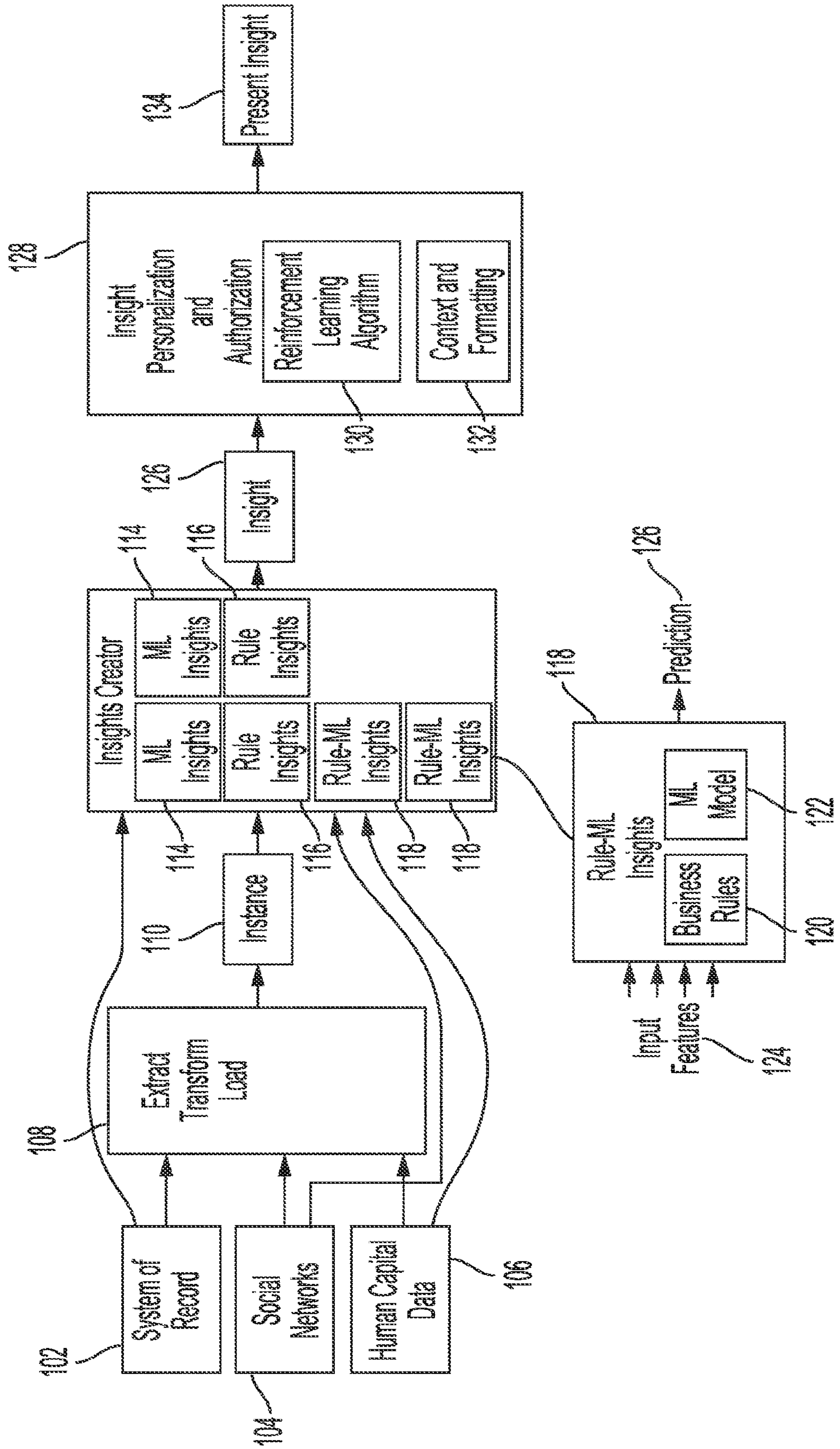
FIG. 1 illustrates an example system embodiment.

Various embodiments of the disclosure are described in detail below. While specific implementations are described, it should be understood that this is done for illustration purposes only. Other components and configurations may be used without parting from the spirit and scope of the disclosure.

One exemplary, non-limiting, practical application to the technical problem noted above is for a system to receive data being entered or executed by one or more users and, based on the type or nature of the data being entered/executed, request that a serverless computing system execute at least one machine learning algorithm on the data. In making the request, the system can identify which machine learning algorithm is needed and request that the serverless computing system execute that machine learning algorithm on the data, such that an "instance" of the machine learning algorithm and the data is created and executed by the serverless computing system. In some cases, where the machine learning algorithm exceeds memory or other size requirements of an instance, the system can compress or otherwise reduce the size of the machine learning algorithm, such that the serverless computing system will execute the machine learning instance on the received data. Alternatively, some serverless computing system are able to auto-scale their computing resources if a larger amount of input is provided.

The output of the machine learning algorithm is an "insight" which points to an aspect of the data which a system user may find helpful. Examples of insights can be an outlier point of data, a violation of previously defined limits, newly established averages, general trends, etc. The system can receive this insight from the serverless computing system, and personalize the insight into a human-friendly presentation (for example, forming a sentence or paragraph based on the insight and the context of the input data). This human-friendly presentation can then be displayed or otherwise transmitted to a human being.

The data received by the system can come from sources such as social networks, including online social media networks such as Facebook®, Linkedin®, Twitter®, Instagram®, etc. The data received can also be received from databases, such as a "system of record" which stores past data. Yet another example source of the received data can include a user directly entering the data into the system, or receiving the data from a different program or system configured to perform a specific task. The system is capable of receiving data from one or more of these sources, both sequentially or in parallel.

The data received can be any type of data, though particular emphasis is placed on human capital data, which can include sub-classes such as human resource data, benefits, payroll processing, retirement plans, tax plans, employment contracts, termination agreements, etc. In some sub-classes the data received can take the form of a spreadsheet or other structured data object, such as an array of numerical entries, and the system may easily use that data for subsequent operations. In other sub-classes, the data may need to be extracted from contracts, agreements, notes, or other data unstructured data sources which are not as computationally friendly. In such cases, the system can perform a data extraction of the meaningful components of the unstructured document(s), and transform or create a computationally-friendly structured data object, such as an array, for use as inputs to a machine learning algorithm. The data extraction process can use text recognition to search for, and extract, terms from the unstructured data object, set aside memory within the system for the structured data object, then populate that structured data object within the extracted terms.

In some configurations, the data received may need speech-to-text processing and/or natural language processing to be executed on the received data, prior to extracting the meaningful terms from the data. For example, if the data received is an audio file or a video file, the system can perform speech to text processing on the audio data received. The subsequent text (or, if not from a video/audio, the received text) can then be processed by the system using natural language processing, thereby allowing the system to identify and extract specific terms and items from within the text.

Once data from one or more sources has been extracted and/or transformed into a format capable of being input into a machine learning algorithm, the formatted data is loaded into an instance of a serverless computing system. With the data loaded into an instance, the system can transmit the instance to the serverless computing system with a request to process the data using a particular machine learning algorithm. In some configurations the serverless computing system may have the machine learning algorithm already saved, whereas in other cases the instance also contains, in addition to the extracted/formatted data, the machine learning algorithm to be executed. Should the size of the instance exceed maximum memory and/or size requirements of the serverless computing system, the machine learning algorithm can be compressed. For example, the machine learning algorithm can be compressed into an ONNX (Open Neural Network Exchange) format, resulting in a compressed modified machine learning algorithm, which can be executed by the serverless computing system.

Where there are multiple machine learning algorithms which can be executed by the serverless computing system, selection of which machine learning algorithms to execute can be made in multiple ways. In some configurations, the serverless computing system can determine, based on the format of the data within the instance, which machine learning algorithm to execute. In such cases, the system receiving the data, extracting and formatting the data, and transmitting the execution request to the serverless computing system can identify which machine learning algorithm to execute based on the type of data received and/or the process which produced the data, and format the data in a particular manner such that serverless computing system executes the desired machine learning algorithm. For example, if payroll is processed and associated data is received by the system, the system can know that one or more machine learning algorithms associated with payroll processing should be executed by the serverless computing system, and can format the data accordingly to trigger such executions. In other configurations, the serverless computing system can receive the instance containing the formatted data and make a identification of which machine learning algorithm(s) within its library of algorithms would likely produce results, then execute one or more of the identified algorithms based on likelihood of results.

In addition to machine learning algorithms, the serverless computing system may execute rule-based algorithms in the same manner as the machine learning algorithms. These rule-based algorithms can, for example, determine if one or more data points within the instance do not comply with established rules for the entity associated with the received data.

Once the serverless computing system has executed the machine learning algorithm(s) (and/or the rule-based algorithm(s)), the serverless computing system generates an insight. Examples of potential insights include identifying one or more data points which are outliers, which do not comply with a business rule, which modify the averages for a given category beyond a predetermined amount, etc. The system, upon receiving the insight from the serverless computing system, can personalize the insight and ensure that the parties with access to the insight have sufficient authorization. With regards to authorization, the system can have predetermined rules identifying a level of authorization required to view different types of insights received, and assign a generated insight a required level of authorization accordingly. Before being transmitted or viewed by a user, the system can verify that the user has a appropriate level of authorization.

The system can also contextually format the received insight. For example, if the insight received indicates that the salary of a particular hire would shift the average pay of men beyond a predetermined threshold distance from the average pay of women, the system can receive that insight and put it into a sentence, such as "Warning: Mr. X's salary would cause average pay of men to be outside of the 5% difference with the average pay of women previously authorized." This contextually formatted version of the insight can then be displayed to a user, communicated to authorized parties, and/or otherwise disseminated.

The system can also execute a reinforcement learning algorithm, using the generated insight as input. The reinforcement learning algorithm can identify which machine learning algorithms produce meaningful insights, and give additional weight to those algorithms when deciding which machine learning algorithms to execute. Likewise, if certain machine learning algorithms are not producing meaningful insights, the system can reduce the likelihood that those algorithms will be executed. The output of the reinforcement learning algorithm can be used as an input to the next machine learning algorithm to be executed. For example, depending on the result of the reinforcement learning algorithm, the system can change or modify which machine learning algorithm is selected and executed. Likewise, depending on the result of the reinforcement learning algorithm, calibrations or other inputs to subsequent machine learning algorithms may be modified or changed.

The examples provided above are generally directed to generating insights based on a given trigger, such as receiving particular types of data, identification of a given event or event type, or execution of a particular type of program. However, in some configurations insights can be scheduled for generation on existing data on a periodic basis. For example, the system may create instances for a serverless computing system, and receive insights from that serverless computing system, on stored data every Sunday night, with the result being that Monday morning staff can review the generated insights and make adjustments during the week.

The disclosure now turns to the examples illustrated in the figures.

FIG. 1 illustrates an example system embodiment. In this example, the system receives initial data 102, 104, 106 from one or more sources, such as a system of record 102 (such as a database or other system recording information about one or more processes), social networks 104, and/or human capital data. Examples of social networks 104 can include Facebook®, Twitter®, Linkedin®, etc. Examples of human capital data can be data associated with human resource activities, payroll processing, employment contracts, termination agreements, health benefits, stock/equity benefits, etc. As the system receives the data 102, 104, 106, the system extracts, transforms, and loads 108 the data into an instance 110 capable of being executed by a serverless computing system. As described above, the extraction of the data may require speech to text processing, as well as natural language processing, to identify which aspects of the received data 102, 104, 106 should be extracted. The extracted data can then be transformed into a format based on the type of data being extracted, the type of insight desired, and/or the type of machine learning algorithm (or rule-based algorithm) to be executed on the data. The extracted, formatted data is then loaded into an instance 110 for execution by a serverless computing system.

The system then requests that a serverless computing system execute the instance 110 using one or more insight generators 112. Inputs to the insight generators 112 can include the instance 110, as well as the data 102, 104, 106 being received by the system. Possible insight generators 112 can include one or more of machine learning insight generators 114, rule-based insight generators 116, and rule-based and machine learning insight generators 118. A machine learning insight generator 114 can use the data loaded into the insight 110 as input, execute a machine learning algorithm on that data, and output an insight 126. In different configurations, the machine learning algorithm 114 executed by the serverless computing system can be loaded into the instance 110 or be previously saved within the serverless computing system. A rule-based insight generator 116 can use the data loaded into the insight 110 as input, compare the data to a known rule (or rules) (such as a business rule) associated with the data, and output an insight regarding the data based on the rule. A hybrid rule-based and machine learning insight generator 118 can use input features 124 (such as the data 102, 104, 106 received by the system and the instance 110), then execute both rules 120 (such as a business rule) and machine learning algorithms 122, with the resulting prediction/insight 126 being output by the serverless computing system.

The system, upon receiving the insight 126 from the serverless computing system, can perform insight personalization and authorization 128 on the received insight 126. Regarding insight personalization, the system can contextually format 132 the received insight to make the received insight understood by human readers. Examples of how to do this can include placing the received insight into previously saved template sentences and paragraphs, such as "Employee [employee name] has received [insight percentage] % more overtime pay than the other employees," or "Firing [employee name] will reduce the average salary of [defined group], which runs contrary to current rules or guidelines." In the above examples, the system can populate the [bracket] fields based on the information provided within the insight 126. In other configurations, rather than using previously saved template sentences and paragraphs, the system can format the received insight 126 into a contextually recognizable format using natural language processing, where the system uses known verbs, nouns, and other parts of grammar associated with the data 108 extracted, transformed, and loaded into the instance 110 to generate a customized sentence and/or paragraph which explains the insight 126. Also, these personalization rules can be quite flexible and can be used in other languages, based on translation rules that are defined. The insight itself is based on the data, but the message itself can be translated and displayed in multiple languages. In some configurations, this translation process can occur simultaneously/in parallel using distinct translation algorithms, such that the translations are provided simultaneously (rather than sequentially).

The system can also set authorization requirements upon receiving the insight 126. For example, the insight 126 can indicate that certain business rules are potentially in danger of being violated, and require individuals with a certain level of authorization review the underlying data. As another example, the system may determine, based on the type of insight 126 generated, that only certain individuals within an organization should be able to view or review the insight 126 or personalized/contextualized insight, and set a level of authorization on the insight 126 such that only certain individuals, or levels of individuals, can view the insight 126 or contextualized insight.

The system can also execute a reinforcement learning algorithm 130, where the insight 126 causes the system to modify or otherwise change its operations based on the insight 126. For example, the system may modify weights associated with different data sources 102, 104, 106; change weighting of insights 126 from the insight generators 112, such that some insight generators are weighted higher or lower than others, and/or differently than previous iterations; modify how or when data extraction, transformation, and loading 108 occur; etc. Also, reinforcement learning can be used based on a given user preferences (customization). For example, the system can collect user interactions (clicks, access to given pages events) and determine if a given user is interested in a particular type of insight. In doing so, the system can personalize the insight display based on user dynamic preferences (similar to what happens in Marketplace stores such as AMAZON.COM, etc.).

The system then presents the insight 134 as a contextually appropriate, personalized insight to individuals with proper authorization. This presentation can occur via computer system, where the authorized individuals receive a message displayed on their computer screens or other display devices (such as smart phones, tablets, etc.). In some configurations, the system can generate different contextually formatted insights for different individuals, based on their distinct levels of authorization. For example, the system may generate a contextually formatted insight "A" for an individual with low authorization, while the system also generates a contextually formatted insight "A+" for an individual with higher authorization, the "A+" insight providing additional details or information which may be privileged or otherwise subject to restricted access. In yet other cases, the contextually formatted insight may vary based on the audience. For example, the system may produce a formatted insight for a first recipient indicating a 20% chance of something occurring, and also produce a formatted insight (based on the same data) for a second recipient indicating an 80% chance of something not occurring. In other words, the system can provide different messages, based on the same underlying data, based on the intended recipient. Determining how the messages are to be formatted or configured can, for example, be based on information about the intended recipient, where the information is gathered, for example, from the social networks 104, from previous interactions the recipients have had with previously generated insights, and/or data provided by the recipients themselves.

Figure 2:
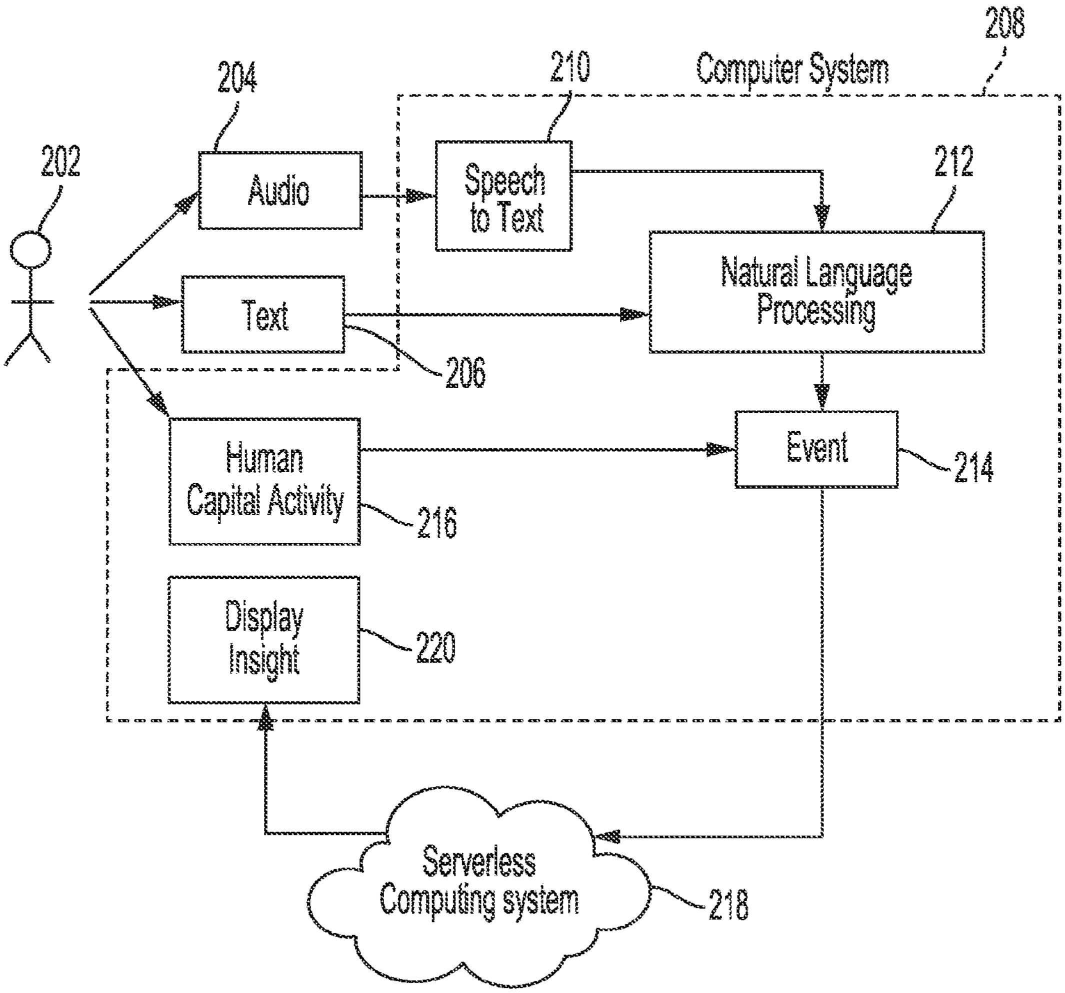
FIG. 2 illustrates an example computer system interacting with a serverless computing system.

FIG. 2 illustrates an example computer system 208 interacting with a serverless computing system 218. In this example, the system has detected an event 214, which will cause the system to request execution of an instance by a serverless computing system 218 based on data associated with the event, with a subsequent display of the insight 220, as described above and illustrated in FIG. 1. Here, as illustrated, the event 214 is triggered based on one or more of human capital activity 216 (such as hiring a new employee, firing an employee, running payroll processing, providing bonuses, etc.), text 206 (such as a contract, agreement, or other written materials), or audio 204 (such as a video recording or audio-only recording), where the activity 204, 206, 216 was performed, created, and/or authorized by a user 202. In some cases, execution of the triggering event may be performed periodically. For example, if the event 214 detected were a human capital activity 216 such as payroll processing, the user 202 may have authorized bi-weekly payroll processing such that an event 214 is detected every two weeks. In the case of audio 204 received, the system may perform speech to text processing 210 of the audio 204, and the resulting text can be processed using natural language processing 212. Likewise, if the data received is text 206, the system may perform natural language processing 212 on the text 206. Extracted data, from natural language processing 212 or from human capital activity 216, can then be used to identify the event 214 and trigger subsequent processing by the serverless computing system 218.

In such an example, the system 208 interacts with the serverless computing system 218 by exchanging data over fiber-optic or other telecommunication mechanisms (Internet, cable, telephone, satellite, etc.). In some configurations, the communications between the system 208 and the serverless computing system 218 can be batched or otherwise bundled together, such that multiple instances are transmitted to the serverless computing system 218 with a single request, and/or such that multiple insights are received from the serverless computing system 218 with a single response. Batching the received insights (and/or the requests) can reduce the amount of bandwidth required to communicate with the serverless computing system 218.

Figure 3:
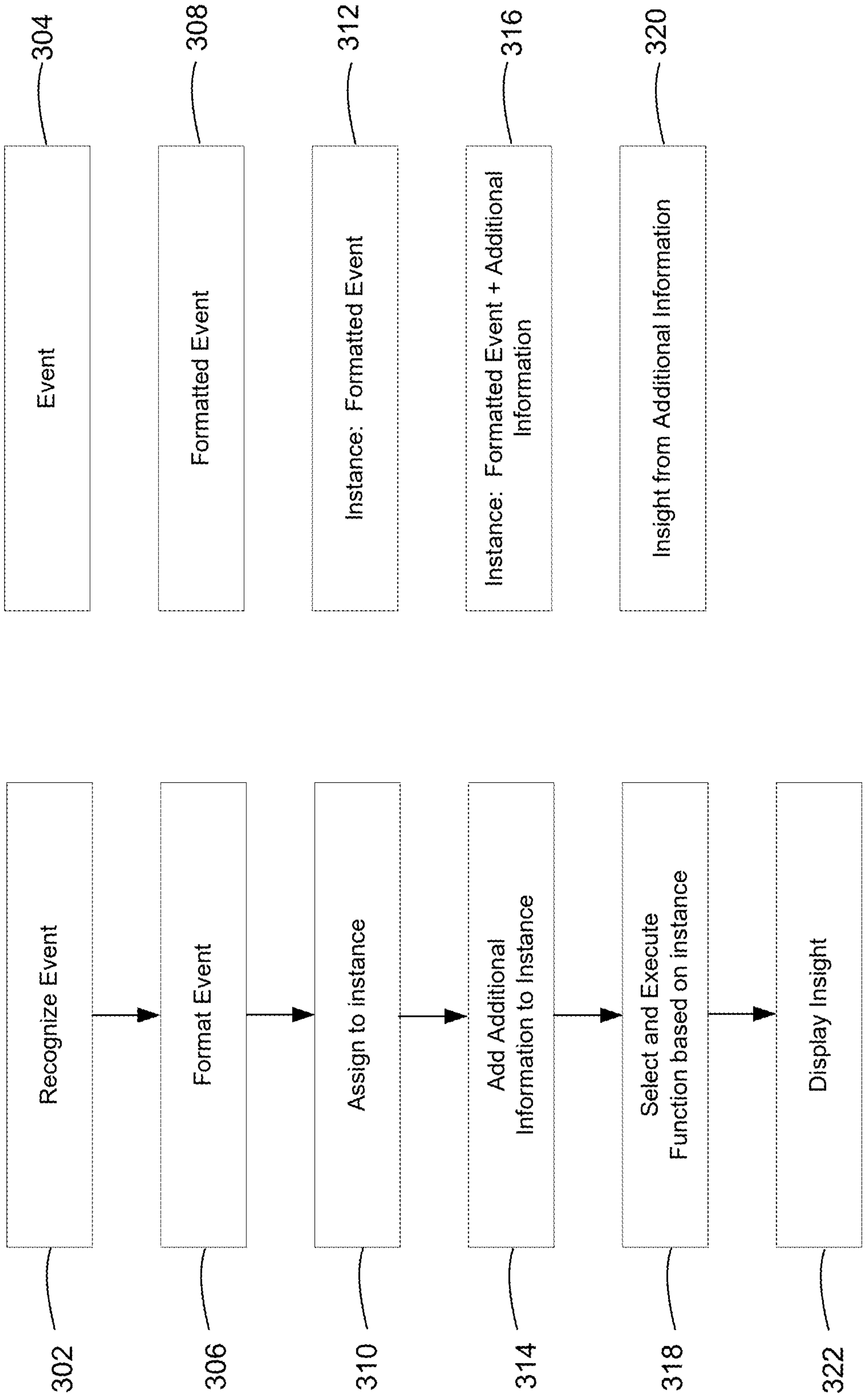
FIG. 3 illustrates an example processing sequence.

FIG. 3 illustrates an example processing sequence. As illustrated, an event 304 occurs, and the system recognizes the event 302. That event 304 can be, for example, a particular process being executed, particular data received or identified, or a certain passage of time. The system formats data associated with the event 306, resulting in a formatted event 308 and/or formatted event data. The formatted event 308 is then assigned to an instance 310, resulting in an instance containing (at least in part) the formatted event 308. If necessary, the system also adds additional information 314 to the instance 312, such as what algorithms to use to process the event data, when to execute such algorithms, a maximum cost of such processing, etc. This addition of information results in the instance containing the formatted event (data) and the additional information 316. The instance 316 is then executed by a serverless computing system, which selects and executes a function 318 (such as a machine learning algorithm and/or rules (such as business rules)) using the data contained within the instance 316. This results in an insight from the additional information 320. In some configurations, the insight may also be based on the formatted event 308, or may exclusively be based on the formatted event 308. The resulting insight is then displayed 322.

Figure 4:
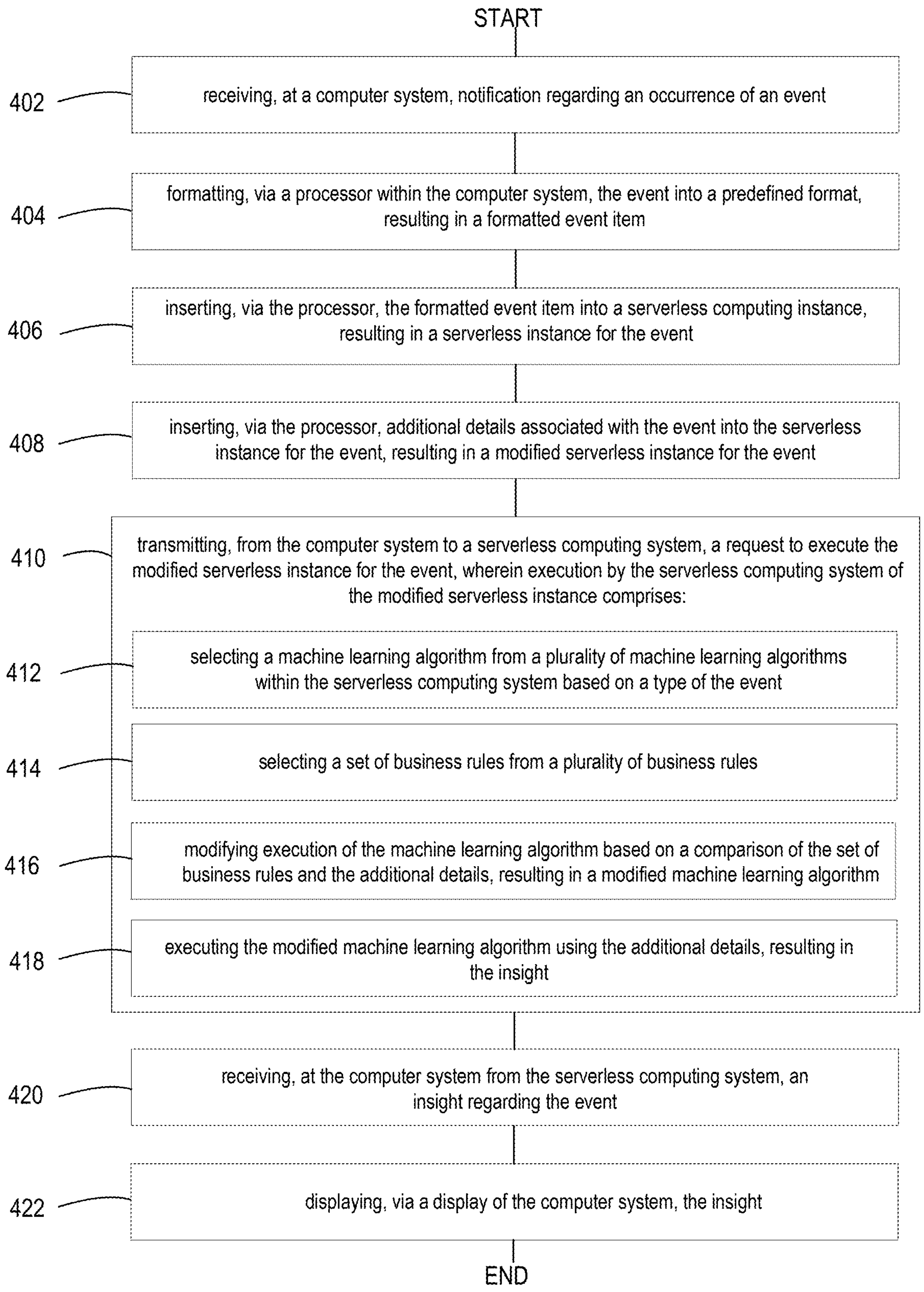
FIG. 4 illustrates an example method embodiment.

FIG. 4 illustrates an example method embodiment, which can, for example, be executed by a computer system. As illustrated, the method includes receiving, at a computer system, a notification regarding an occurrence of an event (402). The system can format, via a processor within the computer system, the event into a predefined format, resulting in a formatted event item (404), and inserts, via the processor, the formatted event item into a serverless computing instance, resulting in a serverless instance for the event (406). The system can also insert, via the processor, additional details associated with the event into the serverless instance for the event, resulting in a modified serverless instance for the event (408). The system can transmit, from the computer system to a serverless computing system, a request to execute the modified serverless instance for the event, wherein execution by the serverless computing system of the modified serverless instance comprises (410): selecting a machine learning algorithm from a plurality of machine learning algorithms within the serverless computing system based on a type of the event (412); selecting a set of business rules from a plurality of business rules (414); modifying execution of the machine learning algorithm based on a comparison of the set of business rules and the additional details, resulting in a modified machine learning algorithm (416); and executing the modified machine learning algorithm using the additional details, resulting in the insight (418). The system can receive, at the computer system from the serverless computing system, an insight regarding the event (420), and display, via a display of the computer system, the insight (420).

In some configurations, the displaying of the insight can further include executing, via the processor, a reinforcement learning algorithm on the insight, resulting in display parameters, and contextually formatting, via the processor, the insight based on the display parameters, resulting in a contextual formation, such that the display of the insight occurs according to the contextual formation.

In some configurations, the illustrated method can further include identifying, via the processor, the event based on natural language processing of at least one of audio and text from a user.

In some configurations, the illustrated method can further include identifying, via the processor, the event based on execution of a human capital activity. An example of the human capital activity can be payroll processing.

In some configurations, the execution by the serverless computing system of the modified serverless instance can further include compressing, via the processor, the modified machine learning algorithm into an ONNX (Open Neural Network Exchange) format, resulting in a compressed modified machine learning model/execution graph, where the modified machine learning model/execution graph executed by the serverless computing system is the compressed modified machine learning algorithm. In such configurations, the serverless computing system can have a maximum data (or minimum) size of instances which can be executed.

Figure 5:
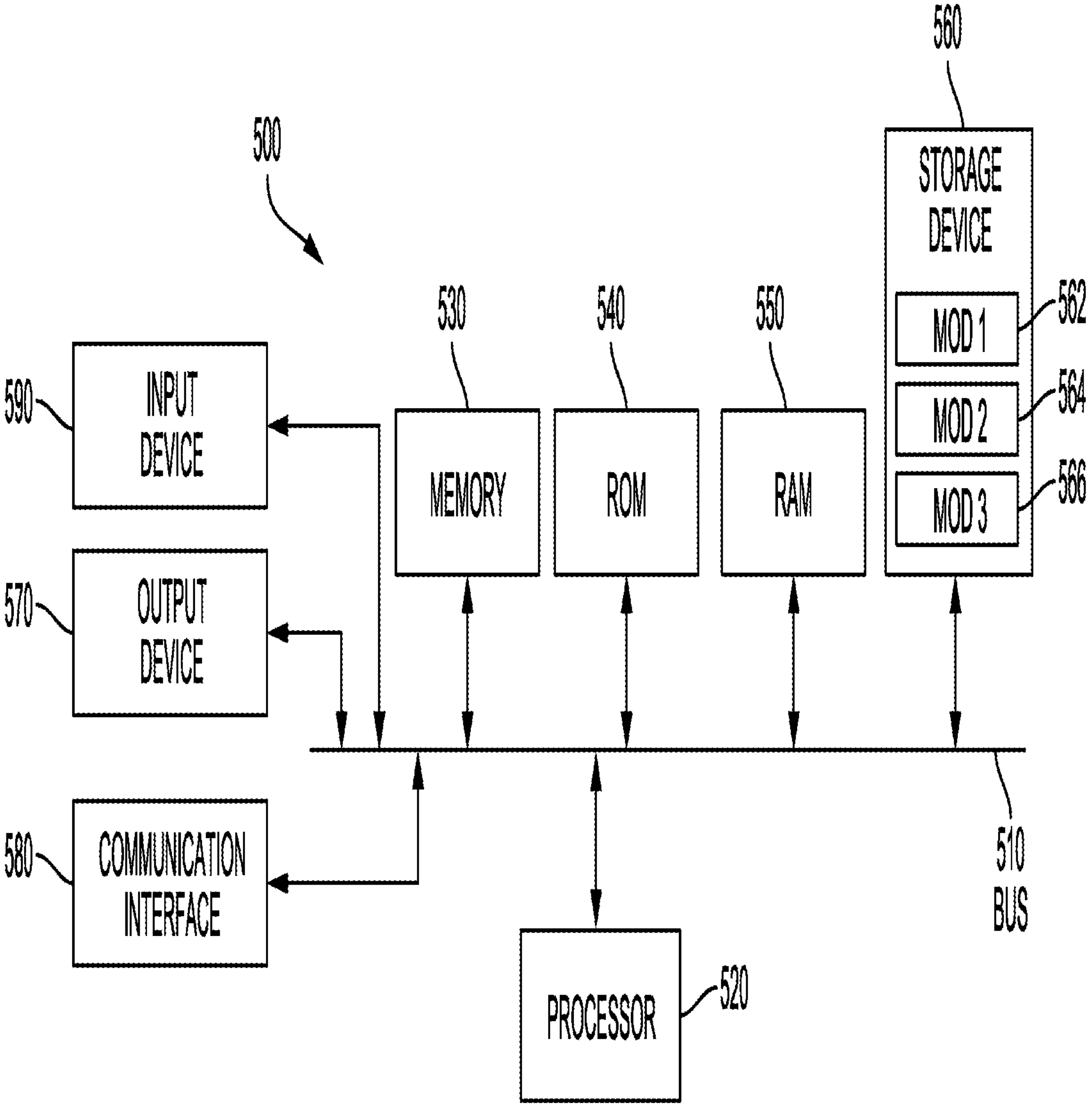
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:

formatting, by one or more processors coupled with memory, event data from at least one network source;

generating, by the one or more processors, a computing instance by inputting the formatted event data into a serverless computing system, the computing instance configured to cause the serverless computing system to apply at least one machine learning algorithm of a plurality of machine learning algorithms to the formatted event data;

selecting, by the one or more processors, the at least one machine learning algorithm from the plurality of machine learning algorithms from a data repository, the at least one machine learning algorithm selected based on a type or format of the event data;

inserting, by the one or more processors, additional data associated with the event data into the computing instance, wherein insertion of the additional data causes the one or more processors to generate a modified computing instance associated with the event data, the modified computing instance configured to cause the serverless computing system to generate a modified machine learning algorithm by modifying execution of the at least one machine learning algorithm based on the additional data;

performing, at runtime, by the one or more processors, at least one of (i) compressing the modified machine learning algorithm responsive to determining the modified machine learning algorithm exceeds a memory or computing resource restriction of the modified computing instance, or (ii) maintaining the modified machine learning algorithm responsive to determining the serverless computing system comprises a feature to automatically scale memory or computing resources;

transmitting, by the one or more processors, a request to cause the serverless computing system to execute the modified computing instance using the modified machine learning algorithm;

receiving, by the one or more processors, outlier data associated with the event data based on execution of the modified computing instance; and transmitting, by the one or more processors, to a client device, data to cause the client device to display a graphical presentation of the outlier data.

2. The method of claim 1, wherein the event data is formatted into a predefined format, and the method further comprising:

receiving, by the one or more processors, a notification regarding an occurrence of the event data from the at least one network source.

3. The method of claim 1, wherein the outlier data corresponds with an insight regarding the event data, and the method comprising:

receiving, by the one or more processors, from the serverless computing system, the insight regarding the event data; and displaying, by the one or more processors, the insight regarding the event data.

4. The method of claim 1, wherein the serverless computing system comprises at least one on-demand or cloud-based computing system.

5. The method of claim 1, wherein transmitting the request causes the serverless computing system to select the at least one machine learning algorithm.

6. The method of claim 1, wherein transmitting the request causes the serverless computing system to select a set of business rules from a plurality of business rules.

7. The method of claim 1, wherein transmitting the request causes the serverless computing system to modify execution of the at least one machine learning algorithm based on a comparison of a selected set of business rules and the additional data.

8. The method of claim 1, wherein the outlier data corresponds with an insight regarding the event data, wherein transmitting the request causes the serverless computing system to execute the modified machine learning algorithm using the additional data to generate a modified insight regarding the event data.

9. The method of claim 1, wherein the event data comprises social media network data, and wherein the at least one network source comprises a social media network.

10. The method of claim 1, further comprising:

executing, by the one or more processors, a reinforcement learning algorithm on the outlier data; and updating, by the one or more processors, the display of the outlier data based on execution of the reinforcement learning algorithm.

11. A system comprising:

one or more processors, coupled with memory, to:

format event data from at least one network source;

generate a computing instance by inputting the formatted event data into a serverless computing system, the computing instance configured to cause the serverless computing system to apply at least one machine learning algorithm of a plurality of machine learning algorithms to the formatted event data;

select the at least one machine learning algorithm from the plurality of machine learning algorithms from a data repository, the at least one machine learning algorithm selected based on a type or format of the event data;

insert additional data associated with the event data into the computing instance, wherein insertion of the additional data causes the one or more processors to generate a modified computing instance associated with the event data, the modified computing instance configured to cause the serverless computing system to generate a modified machine learning algorithm by modifying execution of the at least one machine learning algorithm based on the additional data;

perform, at runtime, at least one of (i) compressing the modified machine learning algorithm responsive to determining the modified machine learning algorithm exceeds a memory or computing resource restriction of the modified computing instance, or (ii) maintaining the modified machine learning algorithm responsive to determining the serverless computing system comprises a feature to automatically scale memory or computing resources;

transmit a request to cause the serverless computing system to execute the modified computing instance using the modified machine learning algorithm;

receive outlier data associated with the event data based on execution of the modified computing instance; and transmit, to a client device, data to cause the client device to display a graphical presentation of the outlier data.

12. The system of claim 11, wherein the event data is formatted into a predefined format, and the one or more processors further to:

receive a notification regarding an occurrence of the event data from the at least one network source.

13. The system of claim 11, wherein the outlier data corresponds with an insight regarding the event data, and the one or more processors further to:

receive, from the serverless computing system, the insight regarding the event data; and display the insight regarding the event data.

14. The system of claim 11, wherein the serverless computing system comprises at least one on-demand or cloud-based computing system.

15. The system of claim 11, wherein transmission of the request causes the serverless computing system to select the at least one machine learning algorithm.

16. The system of claim 11, wherein transmission of the request causes the serverless computing system to select a set of business rules from a plurality of business rules.

17. The system of claim 11, wherein transmission of request causes the serverless computing system to modify execution of the at least one machine learning algorithm based on a comparison of a selected set of business rules and the additional data.

18. The system of claim 11, wherein the outlier data corresponds with an insight regarding the event data, wherein transmission of the request causes the serverless computing system to execute the modified machine learning algorithm using the additional data to generate a modified insight regarding the event data.

19. The system of claim 11, wherein the event data comprises social media network data, and wherein the at least one network source comprises a social media network.

20. A non-transitory computer readable medium (CRM) having one or more instructions stored thereon, the one or more instructions executable by one or more processors to:

format event data from at least one network source;

generate a computing instance by inputting the formatted event data into a serverless computing system, the computing instance configured to cause the serverless computing system to apply at least one machine learning algorithm of a plurality of machine learning algorithms to the formatted event data;

select the at least one machine learning algorithm from the plurality of machine learning algorithms from a data repository, the at least one machine learning algorithm selected based on a type or format of the event data;

insert additional data associated with the event data into the computing instance, wherein insertion of the additional data causes the one or more processors to generate a modified computing instance associated with the event data, the modified computing instance configured to cause the serverless computing system to generate a modified machine learning algorithm by modifying execution of the at least one machine learning algorithm based on the additional data;

perform, at runtime, at least one of (i) compressing the modified machine learning algorithm responsive to determining the modified machine learning algorithm exceeds a memory or computing resource restriction of the modified computing instance, or (ii) maintaining the modified machine learning algorithm responsive to determining the serverless computing system comprises a feature to automatically scale memory or computing resources;

transmit a request to cause the serverless computing system to execute the modified computing instance using the modified machine learning algorithm;

receive outlier data associated with the event data based on execution of the modified computing instance; and transmit, to a client device, data to cause the client device to display a graphical presentation of the outlier data.

* * * * *